UNITED STATES PATENT OFFICE.

WILLIAM B. ROYALL, OF BRENHAM, TEXAS.

IMPROVEMENT IN COMPOUNDS FOR DESTROYING INSECTS ON PLANTS.

Specification forming part of Letters Patent No. 151,439, dated May 26, 1874; application filed May 2, 1874.

*To all whom it may concern:*

Be it known that I, WILLIAM B. ROYALL, of Brenham, in the county of Washington and State of Texas, have invented a new Improvement upon Compounds for Destroying Cotton-Worms or Caterpillars and other insects that infest, eat, and damage the leaves of the potato and cotton plants; and I do hereby declare the following to be a full, clear, and exact description of the same.

In order to form this improved compound I use the following ingredients, and preferably in the following proportions: Paris green, one pound; flour, four pounds; cotton-seed meal, sixteen pounds; but the above proportions may be changed, according to the age and size of the worms, bugs, or insects to be destroyed, and the state of the weather, as a larger quantity will adhere during moist or damp weather.

The paris green, (which is well understood to be the death-dealing poison,) being a heavy substance, cannot be properly mixed with a coarse substance, unless first incorporated with that which is fine; hence, it is first evenly mixed with the fine flour, and then the more equally distributed through the cotton-seed meal, which is rather coarse.

The method of applying this compound is the same as that used for all other powdered compounds for destroying insects, viz., by means of a sieve or dust-sprinkler.

The above is designed as an improvement upon my invention secured to me by Letters Patent No. 140,079, granted on the 17th June, 1873, in that, whereas in the latter only flour, which is high priced, is used as the vehicle of communication to the plant, in the application now made for Letters Patent I substitute, for a large portion of the flour, cotton-seed meal, which is better, because much cheaper, answering its purpose equally as well as the flour, since it also possesses a gummy or glutinous property.

Having thus described this improvement upon my original invention, I claim as new and desire to secure by Letters Patent—

The combination of flour and cotton-seed meal with paris green, for the destruction of cotton-worms or caterpillars, and other pestiferous insects.

WILLIAM B. ROYALL.

Witnesses:
ORLANDO CROZIER,
W. H. THACKER.